United States Patent
Martin

(10) Patent No.: US 7,839,642 B2
(45) Date of Patent: Nov. 23, 2010

(54) HEAT-SINK BRACE FOR FAULT-FORCE SUPPORT

(75) Inventor: James K. Martin, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 12/418,246

(22) Filed: Apr. 3, 2009

(65) Prior Publication Data
US 2009/0251853 A1    Oct. 8, 2009

Related U.S. Application Data

(60) Provisional application No. 61/042,493, filed on Apr. 4, 2008.

(51) Int. Cl.
*H05K 7/20* (2006.01)
(52) U.S. Cl. .................. 361/714; 361/611; 361/704; 361/707
(58) Field of Classification Search ............... None
See application file for complete search history.

(56) References Cited

U.S. PATENT DOCUMENTS

| | | | | | |
|---|---|---|---|---|---|
| 3,471,757 | A | * | 10/1969 | Sias | ............... 257/726 |
| 3,573,569 | A | * | 4/1971 | Davis et al. | .............. 257/714 |
| 3,652,903 | A | * | 3/1972 | Eriksson et al. | .............. 257/726 |
| 3,763,402 | A | * | 10/1973 | Shore et al. | .............. 257/722 |
| 4,338,652 | A | * | 7/1982 | Romanczuk et al. | ........ 361/710 |
| 4,672,422 | A | * | 6/1987 | Schierz | ............... 257/714 |
| 5,883,431 | A | * | 3/1999 | Dubelloy et al. | ............. 257/718 |
| 6,333,853 | B2 | * | 12/2001 | O'Leary et al. | ............. 361/704 |
| 6,429,563 | B1 | | 8/2002 | Rothman et al. | |
| 6,657,320 | B1 | * | 12/2003 | Andrews et al. | .............. 307/64 |
| 7,091,811 | B2 | | 8/2006 | Gudmundson | |
| 7,140,702 | B2 | | 11/2006 | Byron et al. | |
| 2003/0117045 | A1 | | 6/2003 | Byron et al. | |
| 2004/0155746 | A1 | | 8/2004 | Gudmundson | |

FOREIGN PATENT DOCUMENTS

| WO | WO-9727605 A1 | 7/1997 |
|---|---|---|
| WO | WO-9834322 A1 | 8/1998 |
| WO | WO-02103724 A1 | 12/2002 |
| WO | WO-03061358 A2 | 7/2003 |

OTHER PUBLICATIONS

Liebert, "High-Availability Power Systems, Part I: UPS Internal Topology," Nov. 2000, pp. 1-10.

* cited by examiner

*Primary Examiner*—Boris L Chervinsky
(74) *Attorney, Agent, or Firm*—Harness, Dickey & Pierce, P.L.C.

(57) ABSTRACT

A support system for an electrical device arranges the plurality of heat-sink assemblies in an orientation that allows the forces associated with an electrical fault that are transferred to the support structure to be reduced. The arrangement allows the electrical fault forces to cancel one another out such that the resulting net force applied to the support structure is significantly reduced. The size, strength and/or robustness of the support system can be reduced as the forces transmitted thereto are greatly reduced. The heat-sink assemblies can be arranged to facilitate ease of maintenance by allowing the heat-sink assemblies to be removed from a front access panel of the electrical device.

31 Claims, 7 Drawing Sheets

HEAT-SINK BRACE FOR FAULT-FORCE SUPPORT

CROSS-REFERENCE TO RELATED APPLICATIONS

This application claims the benefit of U.S. Provisional Application No. 61/042,493, filed on Apr. 4, 2008. The entire disclosure of the above application is incorporated herein by reference.

FIELD

The present disclosure relates to fault-force supports and, more particularly, to a heat-sink brace for fault-force support.

BACKGROUND

The statements in this section merely provide background information related to the present disclosure and may not constitute prior art.

Electrical components, such as three-phase static switches, may be subject to electrical faults and the forces associated therewith. The fault forces can be in a range of about 4,000 to about 5,000 pounds of force at 100 kAIC. To contain these forces, support braces can be utilized that can withstand those forces. The typical static switches can be disposed in a cabinet and bolted down and spaced apart from one another. For example, the heat sinks for the static switch can be bolted through insulation devices, without an ability to absorb the forces. As a result, significant structural supports are required.

SUMMARY

This section provides a general summary of the disclosure, and is not a comprehensive disclosure of its full scope or all of its features.

A support system for an electrical device, such as a three-phase static switch by way of non-limiting example, arranges the plurality of heat-sink assemblies in an orientation that allows the forces associated with an electrical fault that are transferred to the support structure to be reduced. The arrangement can allow the electrical fault forces to at least partially cancel one another out such that the resulting net force applied to the support structure is significantly reduced. The heat-sink assemblies can be oriented such that two of the heat-sink assemblies produce a similar magnitude of force in a same direction, while the other heat-sink assembly produces a fault force about double that of the other heat-sink assemblies and directed toward the fault produced by the other heat-sink assemblies. As a result, the opposing forces can at least partially cancel one another out, thereby reducing the net force transferred to the support structure. The size, strength and/or robustness of the support system can be reduced as the forces transmitted thereto are greatly reduced. The heat-sink assemblies can be arranged to facilitate ease of maintenance by allowing the heat-sink assemblies to be removed from a front access panel of the electrical device. Simple pressure-applying devices can be utilized to apply a supporting force between these support members and the heat-sink assemblies.

An electrical device with a support system according to the present teachings includes a pair of opposing frame members operable to supply a supporting force. Three heat-sink assemblies each include at least one heat sink and a rectifier puck in heat-transferring relation with the at least one heat sink. The heat-sink assemblies transfer heat from the pucks to a fluid flowing across the heat-sink assemblies. A plurality of insulation members separate the three heat-sink assemblies from one another and electrically isolate the three heat-sink assemblies from one another. Each one of the three heat-sink assemblies is associated with a different phase of a three-phase electric power supply. The framing members support the three heat-sink assemblies and the insulation members. During an electrical fault condition of the electrical device, a first one of the three heat-sink assemblies produces a first force of a first magnitude in a first direction, a second one of the three heat-sink assemblies produces a second force of a second magnitude in a second direction, and a third one of the three heat-sink assemblies produces a third force of a third magnitude in a third direction. At least two of the first, second and third forces at least partially cancel one another out, thereby reducing a total force caused by the fault condition that is transferred to the frame members.

A method of supporting heat-sink assemblies in an electrical device and dissipating electrical fault forces therein according to the present teachings includes electrically isolating three heat-sink assemblies from one another with insulation members disposed between adjacent ones of the three heat-sink assemblies. The three-heat sink assemblies and insulation members are supported from opposing frame members. Different phases of a three-phase power supply are associated with each one of the three heat-sink assemblies. A first electrical fault force of a first magnitude generated by a first one of the three heat-sink assemblies is directed in a first direction. A second electrical fault force of a second magnitude generated by a second one of the three heat-sink assemblies is directed in a second direction. A third electrical fault force of a third magnitude generated by the third one of the three heat-sink assemblies is directed in a third direction. At least two of the fault forces are at least partially cancelled out by one another.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
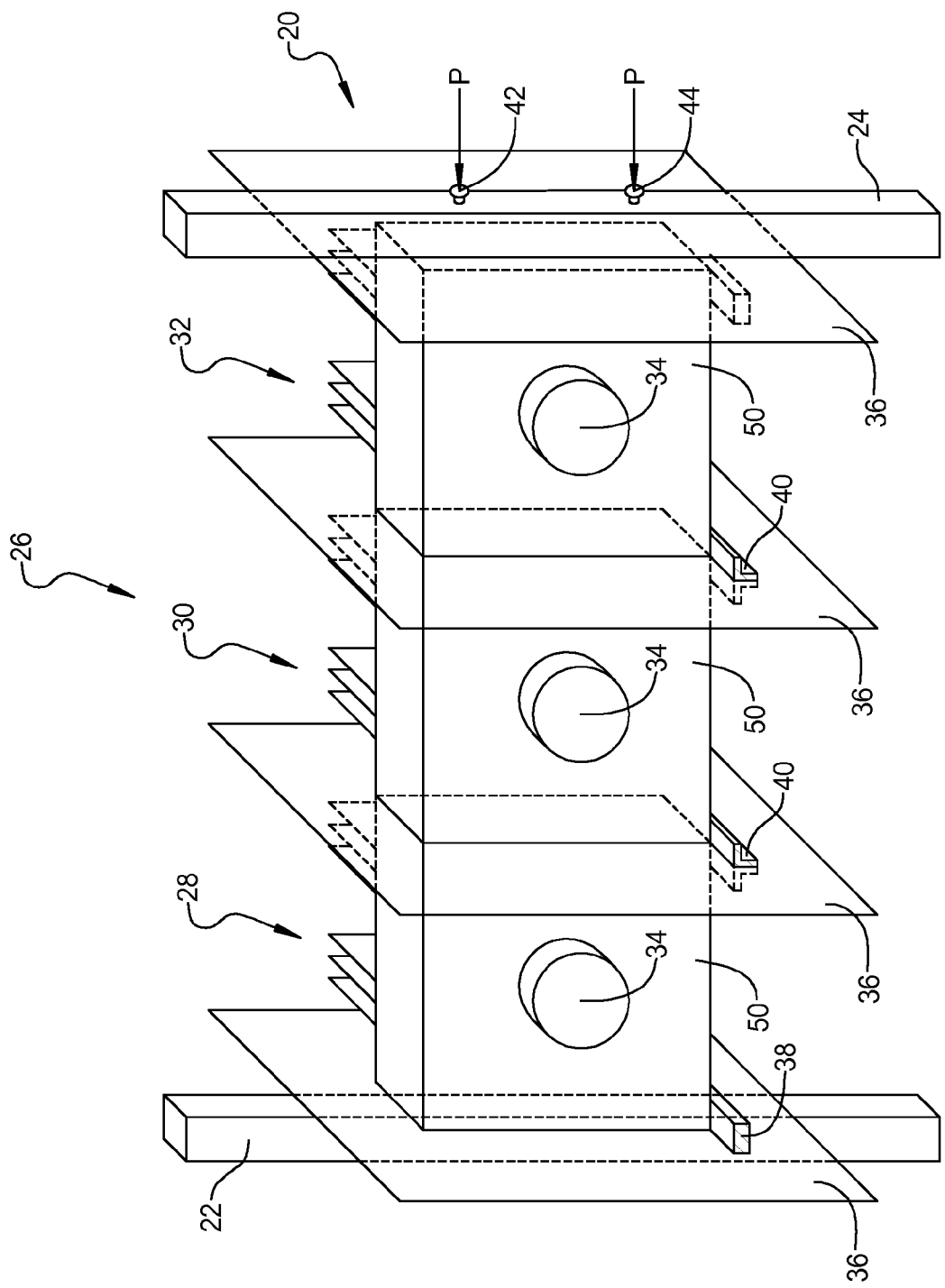
FIG. 1 is a simplified cutaway perspective view of a first embodiment of a support system for heat sinks for supporting fault forces according to the present teachings.

The following description is merely exemplary in nature and is not intended to limit the present disclosure, application, or uses. It should be understood that throughout the drawings, corresponding reference numerals indicate like or corresponding parts and features (e.g., 20, 120, 220, etc.).

According to the present teachings, a static switch which can be easily serviced by service personnel is a multi-part assembly. The multi-part assembly of the static switch enables the ability to breakdown the static switch into small, manageable parts. Having small, manageable parts can facilitate the service of the static switch by service personnel. For example, a 4,000-amp static switch can be advantageously designed to require service personnel to not have to physically lift more than about 50 to about 70 pounds. Additionally, the static switch can maintain electrical insulation at a nominal level of 600 vac, by way of non-limiting example.

Figure 2:
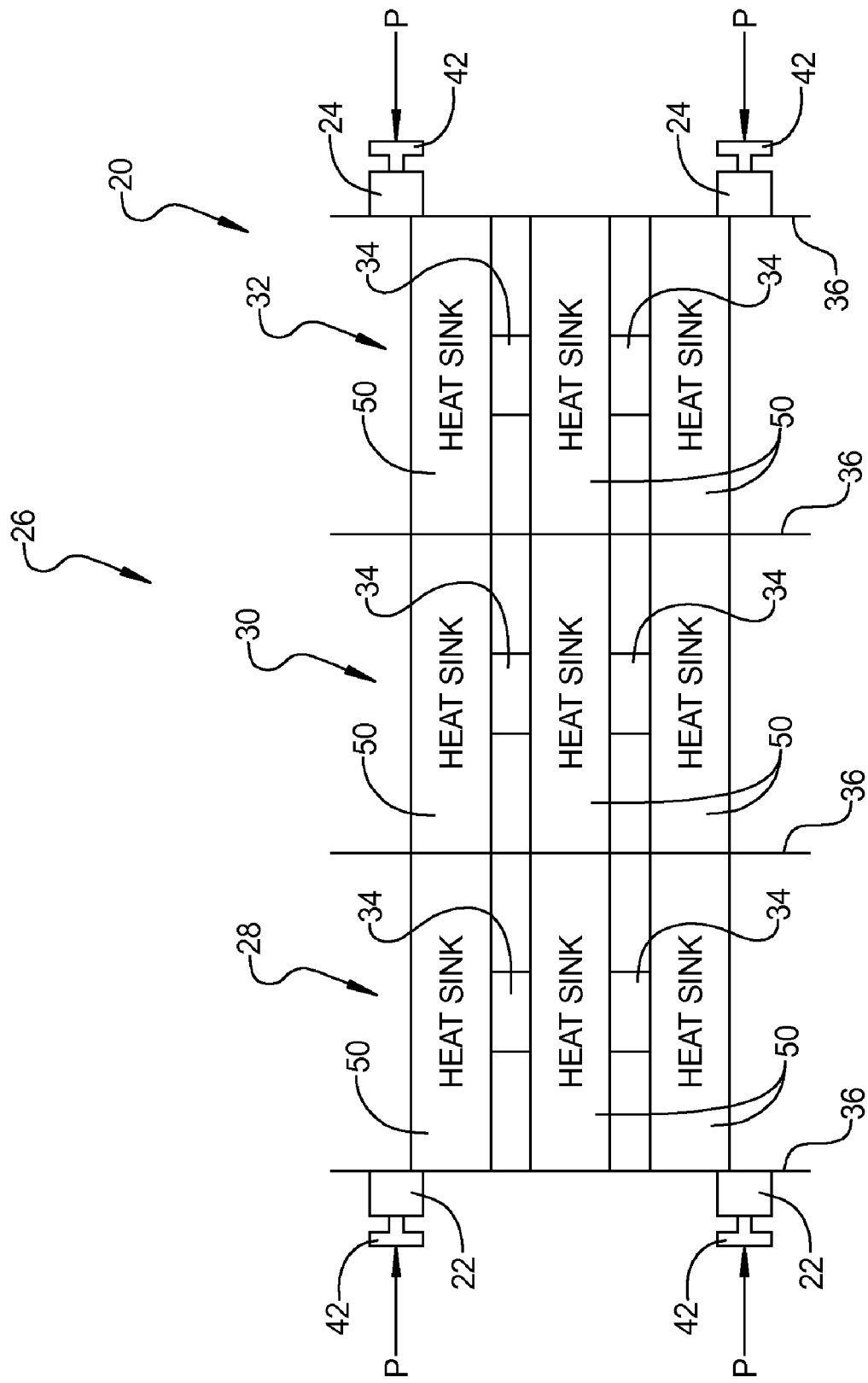
FIG. 2 is a simplified top plan view of the support system of FIG. 1 for supporting fault forces according to the present teachings.
Figure 4:
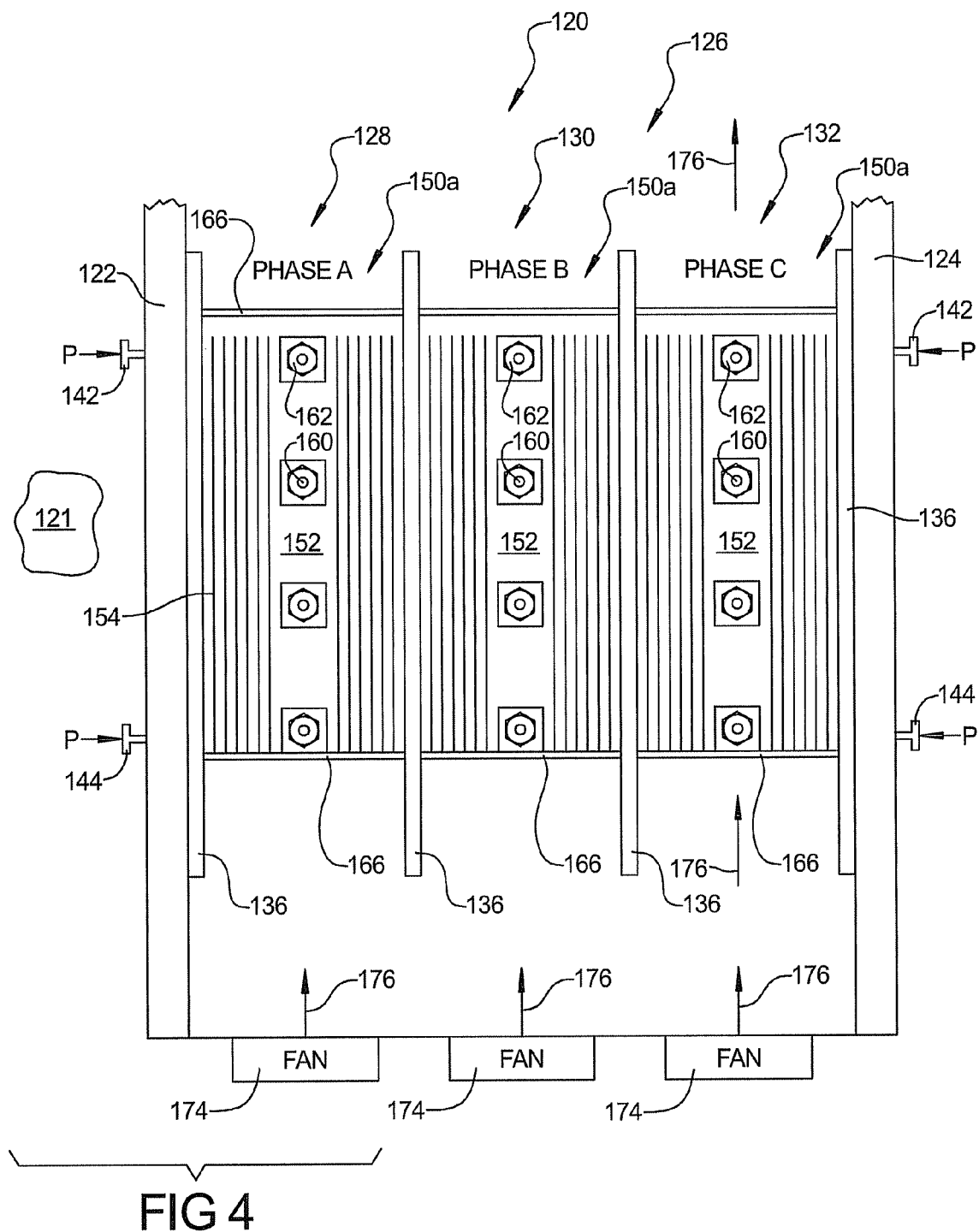
FIG. 4 is a simplified front plan view of a second embodiment of a support system for heat sinks for supporting fault forces according to the present teachings.
Figure 5:
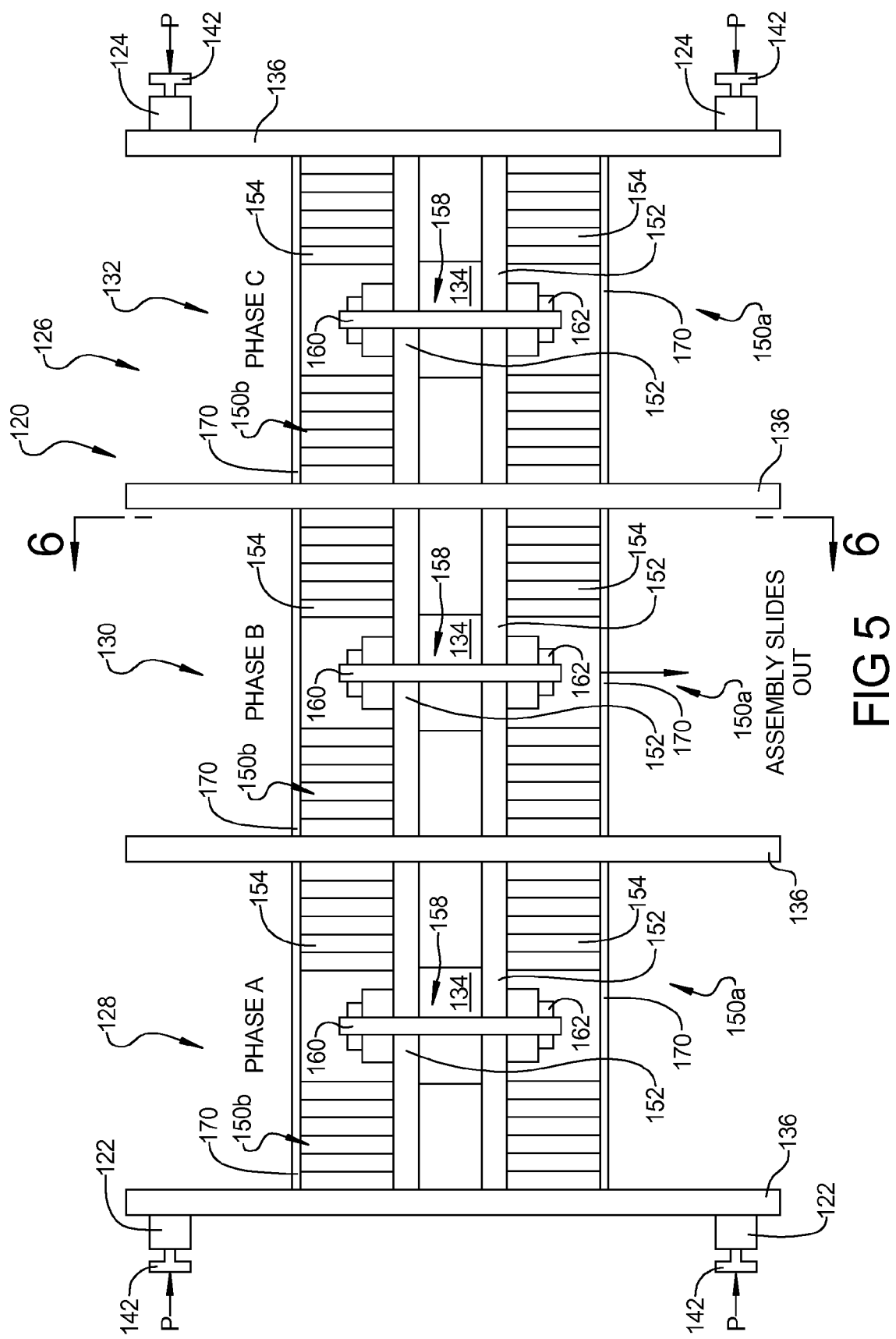
FIG. 5 is a simplified top plan view of the support system of FIG. 4 for supporting fault forces according to the present teachings.

Structural support systems according to the present teachings are generally indicated as 20 in FIGS. 1 and 2 and as 120 in FIGS. 4 and 5. Support systems 20, 120 can provide fault-force bracing that can withstand forces of about 4,000 to about 5,000 lbs. of force at 100 kAIC. The support systems 20, 120 can absorb some of the fault forces and reduce the magnitude of the fault forces translated to the structural members. Support systems 20, 120 can also reduce, possibly to a negligible value, the force transferred to the electrical insulators or conductors utilized in the static switch. The support systems can maintain the ability to slide out components of the static switch, such as the heat-sink assemblies, through the front of a cabinet. This capability allows the static switch to be serviced through front access to the cabinet. The support systems may eliminate the need to have access to the rear or sides of the cabinet to service the static switch.

Referring to FIGS. 1 and 2, a first embodiment of a support system 20 according to the present teachings is shown. Support system 20 includes a plurality of framing members 22, 24 that are on opposite sides of a three-phase static switch (parts of which are partially shown and indicated generally at 26). Static switch 26 can include three heat-sink assemblies 28, 30, 32 that each includes three heat sinks 50 which are each separated by a rectifier puck 34. Rectifier puck 34 can take a variety of forms. By way of non-limiting example, rectifier puck 34 can be a silicon controlled rectifier (SCR) puck, such as those available from Powerex, Inc. of Youngwood, Pa.

Pucks 34 are operable to translate thermal gains from the static switch components to the heat sinks 50 associated with heat-sink assembly 28, 30, 32 and allow air to be passed over the heat-sink assemblies 28, 30, 32 to remove the heat gain. Heat-sink assemblies 28, 30, 32 are electrically hot and require electrical insulation therebetween. For example, sheets of electrical insulation 36 can be disposed between each heat-sink assembly 28, 30, 32. Insulation 36, by way of non-limiting example, can be ¼-inch thick glastic.

Heat-sink assemblies 28, 30, 32 and insulation 36 are disposed between framing members 22, 24. The outer insulation sheets 36 include horizontally extending glides 38 that can vertically support heat sinks 50 of heat-sink assemblies 28, 32 adjacent framing members 22, 24. The inner insulation sheets 36 can also include horizontally extending glides 40 that can provide vertical support for heat sinks 50 on either side. A jig or assembly fixture (not shown) can be utilized to initially position heat-sink assemblies 28, 30, 32 and insulation 36 between framing members 22, 24. Framing members 22, 24 include a plurality of pressure-applying devices 42, 44 that apply slight pressure P inwardly from each framing member 22, 24 and hold heat sinks 28, 30, 32 in place. Pressure-applying devices 42, 44 apply enough pressure P to allow the assembly jig or fixture to be removed and maintain heat-sink assemblies 28, 30, 32 and insulation 36 secured between framing members 22, 24. Additionally, pressure-applying devices 42, 44 supply enough holding force to hold the heat-sink assemblies 28, 30, 32 in place during a fault condition, as described below.

Pressure-applying devices 42, 44 can take a variety of forms. For example, set screws in framing members 22, 24 can be used to apply pressure P from framing members 22, 24 through heat-sink assemblies 28, 30, 32 and the insulation 36 disposed therebetween and onto framing members 24, 22. In an alternate configuration, a threaded rod (not shown) can be utilized as a pressure-applying device 42, 44. Regardless of the form of pressure-applying devices 42, 44, the use of such devices allows for easy removal and replacement of one or more of the heat-sink assemblies 28, 30, 32 in the event service is required.

Figure 3:
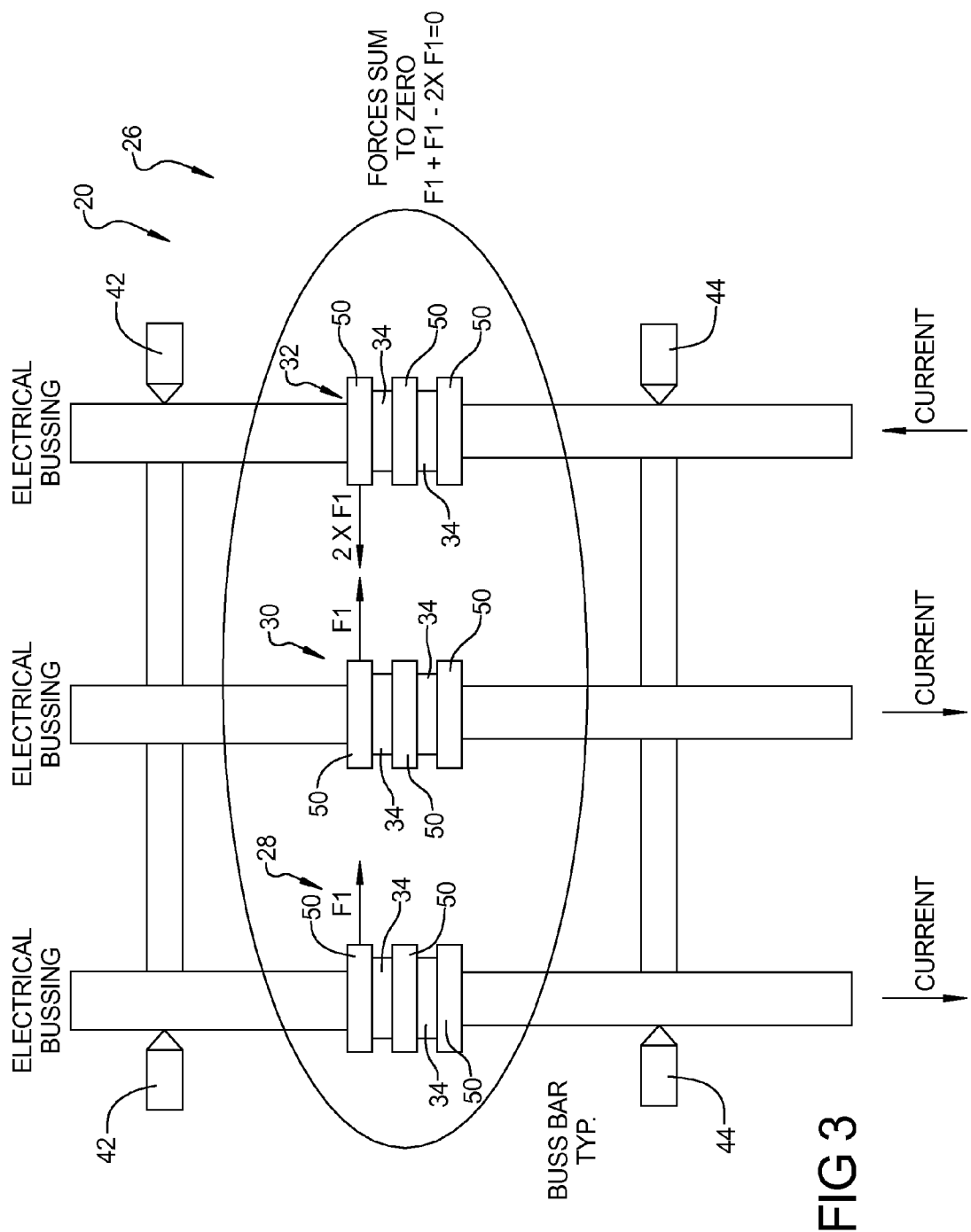
FIG. 3 is a simplified schematic representation of the fault force cancellation with the support system of FIGS. 1 and 2 according to the present teachings.

The support system 20, according to the present teachings, can cancel some of the fault forces and thereby reduce the magnitude of the fault forces translated or transferred to the structural members, such as framing members 22, 24. This is accomplished by arranging the heat-sink assemblies 28, 30, 32 such that current passing through each respective phase of the electrical bussing causes the resulting forces F during a fault condition to cancel one another, thereby reducing the net force transferred to framing members 22, 24 and other components of static switch 26. One skilled in the art will recognize that in the three phase system of FIGS. 1-3, current flows in a first direction through a pair of electrical busses and in an opposite direction at approximately twice the magnitude through the third electrical bus. In the event of a fault condition, the three electrical phases can have their individual electromagnetic forces act in opposite directions such that a reduction in the overall force to be absorbed by framing members 22, 24 is reduced. For example, as shown in FIG. 3, two of the heat-sink assemblies, such as heat-sink assemblies 28, 30, will have a fault force (F1) resulting from the current flow directed in the same direction (to the right in the image depicted in FIG. 3) while the other one of the heat-sink assemblies, such as heat-sink assembly 32, will have twice as large a fault force (2×F1) resulting from the current flow in the opposite direction (to the left in the image depicted in FIG. 3). As a result, the sum of the forces on the electrical bussing of the three phases theoretically can be zero. However, in actuality the forces may not sum to zero and, as a result, some of the forces will be transmitted to framing members 22, 24 through pressure-applying devices 42, 44.

As a result, cancellation of some of the forces associated with electromagnetic effects resulting from a fault condition can be realized and the force required to be sustained by a support system 20 reduced. Additionally, with this arrangement fault forces transferred to electrical insulators and/or conductors can be reduced and/or eliminated. Thus, the arrangement allows for the cancellation of forces associated with a fault condition such that the overall force experienced by support system 20 is reduced.

Figure 6:
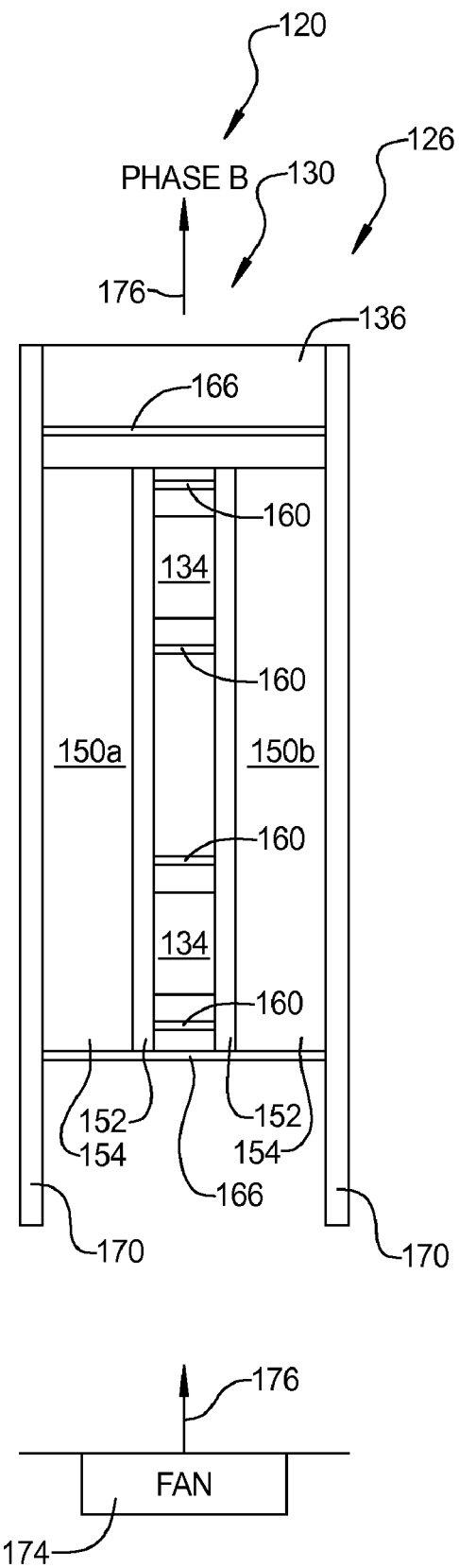
FIG. 6 is a simplified cross-sectional view along line 6-6 of FIG. 5.

Referring now to FIGS. 4-6, a preferred embodiment of a support system 120 according to the present teachings is shown. Support system 120 includes a plurality of framing members 122, 124 that are on opposite sides of a three-phase static switch (parts of which are partially shown and indicated generally at 126). Static switch 126 can include three heat-sink assemblies 128, 130, 132 that are arranged adjacent one another between framing members 122, 124 and separated by sheets of electrical insulation 136. In this embodiment, each heat-sink assembly 128, 130, 132 includes a pair of heat sinks 150a, 150b that are spaced apart with a pair of rectifier pucks 134 therebetween (best seen in FIG. 6). Rectifier pucks 134 are spaced apart vertically from one another, as shown in FIG. 6. Each heat sink 150a, 150b includes an end plate 152 and a plurality of heat-transferring fins 154 extending therefrom. End plate 152 and fins 154 are in heat-transferring relation with one another and with pucks 134. Pucks 134 are disposed between end plates 152 of heat sinks 150a, 150b.

Each heat-sink assembly 128, 130, 132 is held together with a pair of clamps 158 on opposite sides of each puck 134. As shown, two pairs of clamps 158 are utilized to hold a heat-sink assembly together. It should be appreciated that additional clamps or less clamps can be used, as desired. Clamps 158 include a bar member 160 that extends through openings in opposing end plates 152 on opposite sides of pucks 134. The ends of each bar member 160 can be threaded and can include nuts or similar fasteners 162 that allow the end plates 152 of adjacent heat sinks 150a, 150b to be pulled toward one another such that bar member 160 is in tension. Clamps 158 can thereby retain heat sinks 150a, 150b together with pucks 134 disposed therebetween, thereby forming a heat-sink assembly. Bar member 160 and fasteners 162 can be aluminum, by way of non-limiting example.

Rectifier pucks 134 can take a variety of forms. By way of non-limiting example, rectifier pucks 134 can be a silicone controlled rectifier (SCR) puck, such as those available from Powerex, Inc. of Youngwood, Pa. Pucks 134 are operable to translate thermal gains from components of static switch 126 to the associated heat-sink assemblies 128, 130, 132 and allow air to be passed over heat-sink assemblies 128, 130, 132 to remove the heat gain.

Each heat-sink assembly 128, 130, 132 is electrically hot and requires electrical insulation therebetween. Accordingly, sheets of electrical insulation 136 are disposed between each heat-sink assembly 128, 130, 132 and between framing members 122, 124. Insulation 136, by way of non-limiting example, can be ¼-inch thick glastic.

To support heat-sink assemblies 128, 130, 132, a plurality of shelves 166 extends between insulation sheets 136. Shelves 166 are attached to insulation sheets 136 and extend therebetween. Each shelf 166 can support one of heat-sink assemblies 128, 130, 132 between adjacent insulation sheets 136. Shelves 166 can be attached to insulation sheets 136 in a variety of ways. By way of non-limiting example, shelves 166 can be riveted to insulation sheets 136. Shelves 166 and insulation 136 can thereby vertically support heat-sink assemblies 128, 130, 132. Shelves 166 can form a frame with a central opening below fins 154 such that airflow across fins 154 is not prevented by shelves 166. Shelves 166 can also be provided above heat-sink assemblies 128, 130, 132 and help maintain the proper orientation of insulation sheets 136. The upper shelves also can form a frame with a central opening therein to allow airflow across heat-sink assemblies 128, 130, 132.

Heat-sink assemblies 128, 130, 132 and insulation sheets 136 are disposed between framing members 122, 124. A jig or assembly fixture (not shown) can be utilized to initially position heat-sink assemblies 128,130,132 and insulation sheets 136 between framing members 122, 124. Framing members 122, 124 include a plurality of pressure-applying devices 142, 144 that apply slight pressure P inwardly from each framing member 122, 124 and hold heat-sink assemblies 128, 130, 132 and insulation sheets 136 in place. Pressure-applying devices 142, 144 apply enough pressure P to allow the assembly jig or fixture to be removed and maintain heat-sink assemblies 128, 130, 132 and insulation 136 secure between framing members 122, 124. Additionally, pressure-applying devices 142, 144 supply enough holding force to hold heat-sink assemblies 128, 130, 132 and insulation 136 in place during a fault condition, as described below.

Pressure-applying devices 142, 144 can take a variety of forms. By way of non-limiting example, set screws in framing members 122, 124 can be used to apply pressure from framing member 122, 124 through insulation 136 and heat-sink assemblies 128, 130, 132 disposed therebetween and onto framing member 124, 122. In an alternate configuration, a threaded rod (not shown) can be utilized as a pressure-applying device 142, 144. Regardless of the form of pressure-applying devices 142, 144, the use of such devices allows for easy removal and replacement of one or more of the group of heat-sink assemblies 128, 130, 132 in the event service in required.

Support system 120 can also include front and rear plates 170 that extend vertically along heat-sink assemblies 128, 130, 132 between insulation sheets 136, as shown in FIGS. 5 and 6. Plates 170 facilitate the airflow through heat-sink assemblies 128, 130, 132 by containing the airflow within heat-sink assemblies 128, 130, 132 as it flows therethrough. Plates 170 can be secured to insulation sheets 136 with the use of a fastener, slidable interlock, or notch in insulation sheet 136, by way of non-limiting example. Plates 170 and shelves 166 can be sheet metal, by way of non-limiting example.

Static switch 126 may include a plurality of fans 174 that are located below heat-sink assemblies 128, 130, 132. Fans 174 can produce an airflow 176 that can flow across heat-sink assemblies 128, 130, 132 to remove heat therefrom and from static switch 126.

Figure 7:
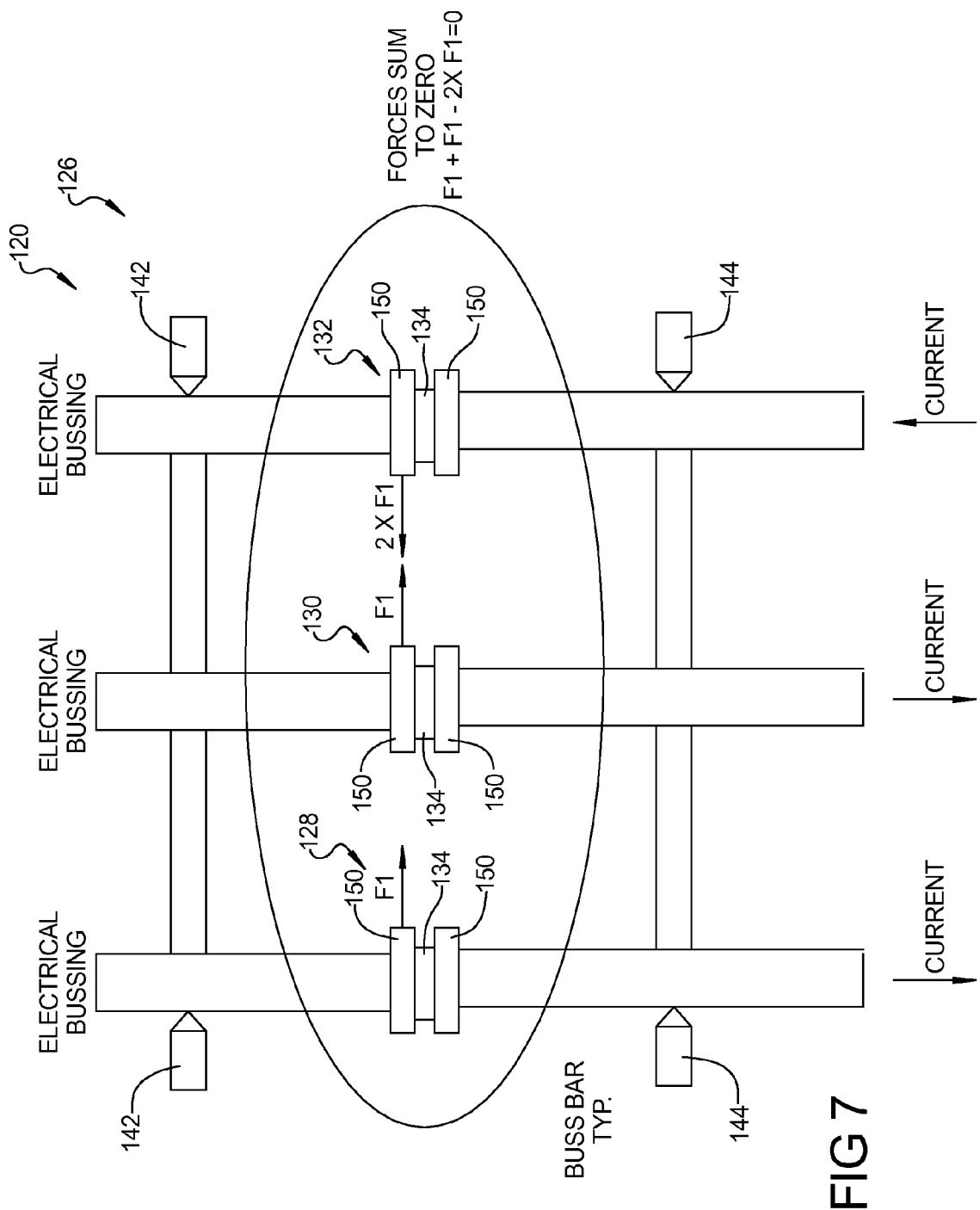
FIG. 7 is a simplified schematic representation of the fault-force cancellation with the support system of FIGS. 4 and 5 according to the present teachings.

Each heat-sink assembly 128, 130, 132 can be associated with one phase of the power running through static switch 126. For example, heat-sink assembly 128 can be associated with Phase A; heat-sink assembly 130 can be associated with Phase B; while heat-sink assembly 132 can be associated with Phase C. The support system 120, according to the present teachings, can cancel some of the fault forces and thereby reduce the magnitude of the fault forces translated or transferred to the structural members, such as framing members 122, 124. This is accomplished by arranging heat-sink assemblies 128, 130, 132 such that currents passing through each respective phase of the electrical bussing causes the resulting forces F during a fault condition can to cancel one another, thereby reducing the net force transferred to framing members 122, 124 and other components of static switch 126. One skilled in the art will recognize that in the three phase system of FIGS. 4-7, current flows in a first direction through a pair of electrical busses and in an opposite direction at approximately twice the magnitude through the third electrical bus. In the event of a fault condition, the three electrical phases can have their individual electromagnetic forces act in opposite directions such that a reduction in the overall force to be absorbed by framing members 122, 124 is reduced. For example, as shown in FIG. 7, two heat-sink assemblies, such as heat-sink assemblies 128, 130, will have a fault force (F1) resulting from the current flow directed in the same direction (to the right in the image depicted in FIG. 7), while another one of these heat-sink assemblies, such as heat-sink assembly 132, will have twice as large a fault force (2×F1) resulting from the current flow in the opposite direction (to the left in the image depicted in FIG. 7). As a result, the sum of the forces on the electrical bussing of the three phases theoretically can be zero. However, in actuality, the forces may not sum to zero and, as a result, some of the forces will be transmitted to framing members 122, 124 through pressure-applying devices 142, 144.

As a result, cancellation of the some of the forces associated with a electromagnetic effects resulting from a fault condition can be realized and the force required to be sustained by support system 120 reduced. Additionally, with this arrangement, fault forces transferred to electrical insulators and/or conductors can be reduced and/or eliminated. Thus, the arrangement allows for the cancellation of forces associated with a fault condition such that the overall force experienced by support system 120 is reduced.

Support system 120 facilitates the servicing of heat-sink assemblies 128, 130, 132. For example, the front panel 121 of static switch 126 can be removed and heat-sink assemblies 128, 130, 132 and insulation sheets 136 can all be removed as a single assembly by reducing the pressure applied by pressure-applying devices 142, 144 and sliding them out. A jig or fixture (not shown) may be used. It may be possible to remove a single heat-sink assembly 128, 130, or 132 when pressure-applying devices 142, 144 are loosened such that a reduction in the weight of the component to be removed is further realized. Furthermore, the ability to remove a single one of heat-sink assemblies 128, 130, 132 can facilitate the repair by only requiring removal of individual heat-sink assemblies instead of all of the assemblies together.

Thus, a structural support system according to the present teachings can absorb some of the fault forces and reduce the magnitude of the fault forces translated to the structural members. The support systems can also reduce, possibly to a negligible value, the force transferred to the electrical insulators or conductors utilized in the static switch. The support system can allow the ability to remove components of the static switch, such as the heat-sink assemblies, through the front of the cabinet. This capability allows the static switches to be serviced through front access to the cabinet. The support system may eliminate the need to have access to the rear or sides of the cabinet to service the switch. Additionally, the support system can be smaller and less intrusive in nature due to the ability of the fault forces to cancel one another and/or reduce one another such that less force is transmitted to the support system.

While the present teachings have been described with reference to a three-phase static switch, it should be appreciated that similar support systems can be utilized with other electrical components, such as inverters and rectifiers. However, it should be appreciated that the inverters and rectifiers may not have the large magnitude fault conditions associated with a static switch.

While the present teachings have been described with reference to specific support systems, it should be appreciated that changes and deviations to the support systems can be made and such changes should not be regarded as a departure from the invention. For example, various components of the heat-sink assembles can be arranged in different orders and construction while still achieving the cancellation of forces and the reduction in the forces required to hold the heat-sink assemblies in place. Additionally, the configuration and/or orientation of the framing members can vary from that shown in order to provide a desired support for the heat-sink assemblies. Moreover, while specific pressure-applying devices are described, other pressure-applying devices may be utilized. Thus, the foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An electrical device with a support system comprising:
a pair of opposing frame members operable to supply a supporting force;
three electrical bussing members disposed between the opposing frame members;
three heat-sink assemblies associated with a respective electrical bussing member, each including at least one heat sink and a rectifier puck in heat-transferring relation with at least one heat sink, the heat-sink assemblies operable to transfer heat from the pucks to a fluid flowing across the heat-sink assemblies; and
a plurality of insulation members separating the three heat-sink assemblies and electrically isolating the three heat-sink assemblies from one another,
wherein each one of the three heat-sink assemblies and respective electrical bussing member is associated with a different phase of a three-phase electric power supply, said frame members support the three heat-sink assemblies and the insulation members, and during an electrical fault condition of the electrical device, a first one of the three heat sink assemblies electrical bussing members produces a first electromagnetic force of a first magnitude in a first direction, a second one of the electrical bussing members produces a second electromagnetic force of a second magnitude in a second direction, and a third one of the electrical bussing members produces a third electromagnetic force of a third magnitude in a third direction, and at least two of the first, second, and third forces at least partially cancel one another out thereby reducing a total force caused by the fault condition that is transferred to the frame members.

2. The electrical device of claim 1, wherein the first and second magnitudes are about equal and the third magnitude is about two times greater than either one of the first magnitude and the second magnitude.

3. The electrical device of claim 1, wherein the first direction and the second direction are substantially the same direction and the third direction is substantially toward the first and second directions thereby allowing the first and second forces to at least partially cancel out the third force.

4. The electrical device of claim 1, wherein the first direction and the second direction are substantially the same direction and the third direction is a substantially opposite direction to the first and second directions thereby allowing the first and second forces to at least partially cancel out the third force.

5. The electrical device of claim 1, wherein the third force substantially cancels out the first and second forces.

6. The electrical device of claim 1, further comprising a plurality of glides on the insulation members and the heat-sink assemblies are vertically supported on the glides.

7. The electrical device of claim 1, further comprising a plurality of shelves with an opening therethrough attached to adjacent ones of the insulating members, the shelves supporting the three heat-sink assemblies disposed between the insulating members and the opening allowing the fluid flow to flow across the heat-sink assemblies.

8. The electrical device of claim 1, further comprising a plurality of pressure-applying devices associated with the frame members, the press-applying devices applying a compressive force on the three heat-sink assemblies and insulating members thereby supporting the three heat-sink assemblies and insulating members from the frame members.

9. The electrical device of claim 8, wherein the pressure-applying devices are set screws engaged with the frame members.

10. The electrical device of claim 1, wherein the electrical device is a three-phase static switch.

11. The electrical device of claim 1, wherein the heat-sink assemblies can be removed from a front access panel of the electrical device.

12. A method of supporting heat-sink assemblies in an electrical device and dissipating electrical fault forces therein, the method comprising:
providing three electrical bussing members;
electrically isolating three heat-sink assemblies associated with a respective bussing member from one another with insulation members disposed between adjacent ones of the three heat-sink assemblies;
supporting the three heat-sink assemblies and insulation members from opposing frame members;
associating each one of the three heat-sink assemblies and respective bussing member with different phases of a three-phase power supply;
directing a first electromagnetic fault force of a first magnitude of a first one of the bussing members in a first direction;
directing a second electromagnetic fault force of a second magnitude of a second one of the bussing members in a second direction;
directing a third electromagnetic fault force of a third magnitude of a third one of the bussing members in a third direction; and
at least partially cancelling out at least a pair of the electromagnetic fault forces with a remaining of the three electromagnetic fault forces.

13. The method of claim 12, wherein the first and second magnitudes are about equal and the third magnitude is about two times greater than either one of the first magnitude and the second magnitude.

14. The method of claim 12, wherein directing the first, second, and third electrical fault forces includes directing the first and second electrical fault forces in a substantially same direction and directing the third electrical fault force substantially toward the first and second directions such that the first and second electrical fault forces are at least partially cancelled out by the third electrical fault force.

15. The method of claim 12, wherein directing the first, second, and third electrical fault forces includes directing the first and second electrical fault forces in a substantially same direction, directing the third force in a substantially opposite direction such that the first and second electrical fault forces are at least partially cancelled out by the third electrical fault force.

16. The method of claim 12, wherein at least partially cancelling includes substantially cancelling out the first and second electrical forces with the third electrical force.

17. The method of claim 12, wherein supporting includes vertically supporting the three heat-sink assemblies on glides attached to the insulating members.

18. The method of claim 12, wherein supporting includes vertically supporting the three heat-sink assemblies on shelves attached to the insulating members and having an opening therethrough that allow a fluid flow across the three heat-sink assemblies.

19. The method of claim 12, wherein supporting includes applying a compressive force on the three heat-sink assemblies and insulating members with pressure-applying devices associated with the frame members thereby supporting the three heat-sink assemblies and insulating members from the frame members.

20. The method of claim 19, wherein supporting includes adjusting the compressive force with set screws engaged with the frame members.

21. The method of claim 12, wherein the electrical device is a three-phase static switch.

22. An electrical device comprising:
a plurality of busbars, each conducting a phase of a multi-phase power delivery system, wherein the busbars are generally parallel and when current in a first busbar flows in a first direction, current in a second busbar flows in an opposite direction;
a pair of opposing frame members supporting the plurality of busbars;
a heat-sink assembly associated with a respective busbar, each heat sink including at least one heat sink and a rectifier puck in heat-transferring relation with an associated busbar, the heat-sink assemblies operable to transfer heat away from the pucks; and
a plurality of insulation members separating the heat-sink assemblies and electrically isolating the heat-sink assemblies from each another,
wherein the frame members support the heat-sink assemblies and the insulation members, and during an electrical fault condition, one of the first or second busbars produces an electromagnetic force of a first magnitude in a first direction, and the other of the first or second busbars produces an electromagnetic force of a second magnitude in an opposite direction, the first and second magnitudes at least partially cancelling one another out, thereby reducing a total force caused by the fault condition transferred to the frame members.

23. The electrical device of claim 22, wherein the electrical device is a three-phase switch, and the plurality of busbars comprises a trio of busbars.

24. The electrical device of claim 23, wherein one of the first and second magnitudes are generated by two of the trio of busbars and the other of the first and second magnitudes is generated by the other of the trio of busbars, and further wherein the first and second magnitudes are about equal.

25. The electrical device of claim 23, wherein the electromagnetic forces generated by two of the trio of busbars are substantially equal and in a first direction, and the electromagnetic force generated by the other of the trio of busbars is substantially equal to the force generated by the two busbars and in an opposite direction.

26. The electrical device of claim 23, wherein the forces generated by two of the trio of busbars are in substantially the same direction and the force generated by the other of the trio of busbars is in a substantially opposite direction, thereby allowing the first and second forces to at least partially cancel out the third force.

27. The electrical device of claim 22, further comprising a plurality of glides on the insulation members and the heat-sink assemblies are vertically supported on the glides.

28. The electrical device of claim 22, further comprising a plurality of shelves with an opening therethrough attached to adjacent ones of the insulating members, the shelves supporting the heat-sink assemblies disposed between the insulating members and the opening allowing fluid to flow across the heat-sink assemblies.

29. The electrical device of claim 22, further comprising a plurality of pressure-applying devices associated with the frame members, the press-applying devices applying a compressive force on the heat-sink assemblies and insulating members thereby supporting the three heat-sink assemblies and insulating members from the frame members.

30. The electrical device of claim 25 wherein the pressure-applying devices are set screws engaged with the frame members.

31. The electrical device of claim 22, wherein the heat-sink assemblies can be removed from a front access panel of the electrical device.

* * * * *

UNITED STATES PATENT AND TRADEMARK OFFICE
CERTIFICATE OF CORRECTION

| | | |
|---|---|---|
| PATENT NO. | : 7,839,642 B2 | Page 1 of 1 |
| APPLICATION NO. | : 12/418246 | |
| DATED | : November 23, 2010 | |
| INVENTOR(S) | : James K. Martin | |

It is certified that error appears in the above-identified patent and that said Letters Patent is hereby corrected as shown below:

Column 5,
Line 25, "silicone" should be --silicon--.

Column 6,
Line 14, "in" should be --is--.
Line 43, "can" should be deleted.

Column 7,
Line 1, after "cancellation of", delete "the".
Line 2, "a" should be deleted.

Column 8,
Line 25, Claim 1, "three heat sink assemblies" should be deleted.

Column 10,
Line 66, Claim 29, "press-applying" should be --pressure-applying--.

Signed and Sealed this
Third Day of May, 2011

David J. Kappos
*Director of the United States Patent and Trademark Office*